United States Patent [19]

Preble et al.

[11] Patent Number: 4,488,856
[45] Date of Patent: Dec. 18, 1984

[54] HYDRAULIC POWER SUPPLY WITH HERMETIC SEALING OF HYDRAULIC FLUID AND SEALING METHOD

[75] Inventors: John M. Preble; John A. Anderson; Lawrence D. McGee, all of Rockford, Ill.

[73] Assignee: Sundstrand Corporation, Rockford, Ill.

[21] Appl. No.: 535,591

[22] Filed: Sep. 26, 1983

[51] Int. Cl.³ .............................................. F04B 17/00
[52] U.S. Cl. .................................................... 417/409
[58] Field of Search ............... 417/405, 406, 409, 407, 417/408; 222/334; 60/257, 259

[56] References Cited

U.S. PATENT DOCUMENTS

| | | | |
|---|---|---|---|
| 2,585,626 | 2/1952 | Chilton | 60/259 |
| 2,750,892 | 6/1956 | Johnson | 417/409 |
| 3,128,601 | 4/1964 | Abild | 60/259 |
| 3,358,455 | 12/1967 | Hunt | 60/257 |
| 4,033,115 | 7/1977 | Baits | 60/39.462 |

Primary Examiner—Carlton R. Croyle
Assistant Examiner—Timothy S. Thorpe
Attorney, Agent, or Firm—Wood, Dalton, Phillips, Mason & Rowe

[57] ABSTRACT

A hermetically sealed hydraulic power supply having an oil reservoir with a pump for pumping oil from the reservoir which is driven by a gas turbine. The gas turbine has a turbine cavity and fluid inlet and exhaust passages communicating therewith. A pair of burst discs are positioned to block the turbine cavity and a quantity of oil fills the turbine cavity and extends to the burst discs to isolate the oil reservoir from the environment and preclude the existence of any space to which reservoir oil could leak. A bellows is positioned to permit thermal expansion and contraction of the oil sealed in the turbine cavity by the burst discs.

10 Claims, 1 Drawing Figure

U.S. Patent  Dec. 18, 1984  4,488,856
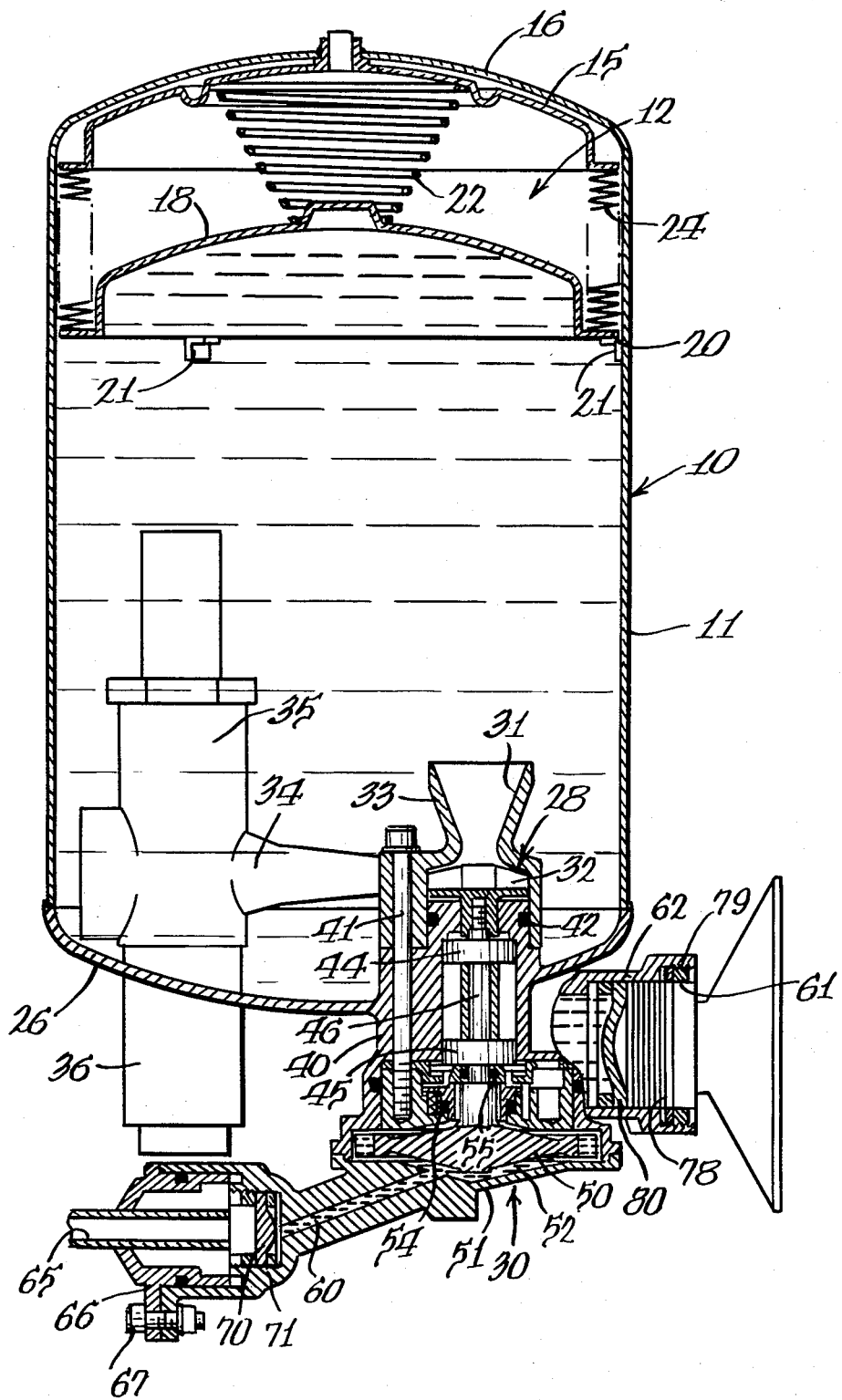

HYDRAULIC POWER SUPPLY WITH HERMETIC SEALING OF HYDRAULIC FLUID AND SEALING METHOD

DESCRIPTION

1. Technical Field

This invention pertains to a hydraulic power supply with hermetic sealing of hydraulic fluid and, more particularly, to a hydraulic power supply having an oil reservoir with a turbine-driven pump for pumping oil from the reservoir. The turbine has a turbine cavity which is sealed and filled with oil whereby leakage of oil from the reservoir to the turbine cavity and resulting migration of air from the turbine cavity to the oil in the reservoir is avoided to preclude degradation of the quality of oil in the reservoir.

2. Background Art

In the operation of missile control components in flight, it is known to have a hydraulic power supply which is inactive during storage of the missile and, when required for use, is activated by a power source, such as hot gas derived from a propellant gas generator. The hydraulic power supply has a reservoir in which oil is stored and, when oil is required for operation of the missile control components, the hot gas is delivered to a gas turbine which drives a pump for pumping oil from the reservoir. The connection of the gas turbine to the pump involves a penetration of the wall of the reservoir, with the penetration including a drive shaft interconnecting the turbine wheel of the turbine and the pump. Seals are used in an effort to seal against leakage of oil from the reservoir to the turbine cavity in which the turbine wheel is positioned. There can be leakage of oil past the seals into the turbine cavity, particularly with a missile being subject to long storage, and resulting migration of air from the turbine cavity to the reservoir to degrade the quality of the oil. When the hydraulic power supply is operational, there can be unsatisfactory operation of control components by the oil which is delivered from the reservoir. Unsatisfactory operation can also result from loss of oil from the reservoir.

It is further known in the prior art to have gas inlet and gas exhaust passages for the turbine sealed by burst discs in order to limit the potential leakage volume and with the burst discs being ruptured upon operation of the propellant gas generator. This limitation of the volume subject to leakage still did not preclude the existence of a volume of air which could migrate into the reservoir.

DISCLOSURE OF THE INVENTION

A primary feature of the invention is to provide a hydraulic power supply having an oil reservoir with means for pumping oil from the reservoir including a gas-driven turbine for driving a pump and with the turbine having a turbine cavity which is sealed by a pair of burst discs and filled with oil.

Another feature of the invention is to provide a hydraulic power supply, as defined in the preceding paragraph and having means for compensating for thermal expansion and contraction of the oil sealed by the burst discs.

Another feature of the invention is to provide a method of preventing entry of air from a gas turbine cavity to an oil reservoir in a hydraulic power supply having a pump for pumping oil from the reservoir which is driven by the gas turbine and a pair of burst discs positioned to block fluid ingress and egress relative to said turbine cavity comprising, filling the turbine cavity with oil to preclude the existence of any significant space to which oil could leak from the reservoir, and positioning a bellows to compensate for thermal expansion and contraction of the oil sealed by the burst discs.

BRIEF DESCRIPTION OF THE DRAWING

The FIGURE is a generally vertical central section through the components of the hydraulic power supply.

BEST MODE FOR CARRYING OUT THE INVENTION

The hydraulic power supply has a reservoir, indicated generally at 10, with a generally cylindrical wall 11, which is provided at one end with an accumulator, indicated generally at 12. The accumulator has a concave base plate 15 lying adjacent an end wall 16 of the reservoir and a concave movable plate 18 with a peripheral flange 20 which is urged toward a series of stops formed by stops 21 mounted to the interior of the reservoir wall 11 by a spring 22 positioned in a space between the base plate 15 and movable plate 18. The space housing the spring 22 is sealed off from oil within the reservoir by a bellows 24 fastened at its opposite ends to the plates 15 and 18.

The reservoir has an end cap 26 secured to the cylindrical wall 11, as by welding. The space within the reservoir between the movable plate 18 and the end cap 26 is filled with hydraulic fluid, such as oil used in hydraulic control systems. Oil is pumped from the reservoir by pumping means, indicated generally at 28, with the pump being driven by a gas turbine, indicated generally at 30. The pumping means 28, as shown, is a centrifugal pump having an impeller 32 mounted within a pump casing 33 having an inlet opening 31 for drawing oil from the reservoir. The pumped oil discharges toward an outlet through a passage (not shown) in a tubular member 34 which is part of a housing 35 for a relief valve (not shown) which, upon over-pressurization of the oil, can open and permit return of oil to the reservoir. The housing 35 has a flow connection to an outlet 36 for discharge of oil to a control system utilizing the oil.

The pump casing 33 is fitted onto a tubular section 40 of the end cap 26 of the reservoir and held thereto by a series of fastening members, one of which is shown at 41. The tubular section 40 is sealed to the casing 33 by an O-ring 42 and has a tubular opening therein mounting a pair of bearings 44 and 45 which rotatably mount a drive shaft 46 which extends between and is connected to a hub of the centrifugal pump and a hub of a turbine wheel 50 of the gas turbine 30.

The gas turbine 30 has a casing 51 formed with a turbine cavity 52 for the turbine wheel 50. The turbine casing 51 fits within an end of the tubular section 40 and is sealed relative thereto by an O-ring and secured by fastening members including the fastening members 41. A face seal comprising members 54 and 55 and coacting O-rings are provided to seal the turbine cavity 52 from the reservoir 10.

The gas turbine has a gas inlet passage 60 in the turbine casing 51 leading to the turbine cavity. A gas exhaust passage 61 is formed in the turbine casing 51 and in a connecting plenum having a tubular component 62 and extends from the turbine cavity 52.

A propellant gas generator, as known in the art, is operable to generate hot gas which is delivered through a pipe 65 to the gas inlet passage 60. The pipe 65 is held in position by a fitting 66 sealed to an enlarged opening at the end of the turbine casing 51 and held thereto by fastening members, one of which is shown at 67. Communication between the pipe 65 and the gas inlet passage 60 is blocked by sealing means in the form of a burst disc 70 sealed at its periphery to an externally-threaded tubular member 71 which threads into the enlarged end of the turbine casing and which may be sealed thereto in a suitable manner, as by welding. The burst disc is an element known in the art and may be formed of thin metal or a rigid plastic which provides an effective fluid seal, but which will rupture upon delivery of gas through the pipe 65 whereby the gas may travel to the turbine cavity 52. The gas exhaust passage 61 is formed within the plenum and terminates in the tubular component 62 thereof. A bellows 78 with a central passage is positioned within the gas exhaust passage 61 and held in position by an externally-threaded ring 79 threaded into the tubular component 62 and sealed as by welding. An inner end of the bellows 78 mounts sealing means in the form of a burst disc 80 for sealing the central opening in the bellows 78. The burst disc 80 may be of the same type of material as the burst disc 70 and will rupture when gas flows through the turbine to permit flow through the central passage of the bellows.

The pipe 65 may have a control valve which can seal the gas inlet passage, in which case the burst disc 70 is not required.

The space provided by gas inlet passage 60, the turbine cavity 52, and the gas exhaust passage 61 results in a volume which can hold a quantity of air after the hydraulic power supply is in place for intended use. Although seals are provided between the interfitted parts which penetrate the end cap 26 of the reservoir, it is possible for oil which is under pressure in the reservoir 10 to leak into the turbine cavity 52 and connecting spaces and displace air which migrates into the reservoir. The presence of air within the oil supply can affect the performance of the components operated by the oil when the hydraulic power supply becomes operative and, thus, effectively degrades the oil. This problem is overcome by filling the turbine cavity with oil and with oil also extending to the burst discs 70 and 80 with the result that there is no space to which oil can leak from the oil reservoir. The bellows 78 mounts the burst disc 80 for floating movement whereby the oil sealed between the burst discs 70 and 80 may thermally expand and contract.

Upon start-up of the hydraulic power supply, delivery of gas and, more particularly a hot gas, from the propellant gas generator through the pipe 65 ruptures the burst disc 70 and a pressure build-up ruptures the burst disc 80, whereby gas flows through the turbine and the gas as well as the oil initially stored in the turbine cavity flow through the gas exhaust passage 61.

From the foregoing, it will be evident that a method has been provided for preventing entry of air into and preventing leakage of oil from the reservoir by filling the turbine cavity of the gas turbine with oil which extends to a pair of burst discs positioned to block communication with the turbine cavity and positioning a bellows subject to pressure of oil in the turbine cavity to compensate for thermal expansion and contraction of the oil sealed by the burst discs.

We claim:

1. A hydraulic power supply comprising, an oil reservoir having an outlet, a pump communicating with the reservoir for pumping oil to said outlet, a turbine for driving the pump, a turbine casing having a turbine cavity and fluid inlet and exhaust passages communicating with the turbine cavity, a pair of burst discs positioned one in each of said inlet and exhaust passages, and a quantity of oil filling the turbine cavity and extending to said burst discs to preclude the existence of an air-filled space to which oil could leak from the oil reservoir during storage and prior to operation of the turbine and pump.

2. A hydraulic power supply as defined in claim 1 including a bellows positioned to compensate for thermal expansion and contraction of oil sealed by the burst discs.

3. A hydraulic power supply as defined in claim 2 wherein the bellows is sealed to one of said passages and has a central opening and one of said burst discs is movably carried by the bellows and seals said central opening.

4. A hydraulic power supply comprising, an oil reservoir having an outlet, a pump in the reservoir for pumping oil to said outlet, a turbine for driving the pump, a turbine casing having a turbine cavity and fluid inlet and exhaust passages communicating with the turbine cavity, a pair of burst discs positioned one in each of said inlet and exhaust passages, a quantity of oil filling the turbine cavity and extending to said burst discs to preclude the existence of any significant volume of air that might otherwise migrate to the reservoir as oil leaks from the reservoir to the turbine cavity, and a bellows positioned to permit thermal expansion and contraction of the oil sealed by said burst discs.

5. A hydraulic power supply comprising, an oil reservoir having an outlet, a pump in the reservoir for pumping oil to said outlet, a gas turbine positioned externally of the reservoir and having a casing fastened to the reservoir, the casing having a turbine cavity and gas inlet and exhaust passages communicating with the turbine cavity, a turbine wheel mounted in the turbine cavity, a drive shaft extending through an opening in the turbine casing and interconnecting the turbine wheel and the pump, a pair of burst discs positioned one in each of said gas inlet and exhaust passages, a quantity of oil filling the turbine cavity and extending to said burst discs to preclude the leakage of oil from the reservoir to the turbine cavity and migration of air to the reservoir, and a bellows positioned to permit thermal expansion and contraction of the oil sealed by said burst discs.

6. A hydraulic power supply having an oil reservoir and means for pumping oil from the reservoir comprising a pump and a fluid-driven turbine and drivingly connected to the pump, the turbine having a turbine cavity and fluid inlet and exhaust passages communicating with the turbine cavity, the improvement comprising a pair of burst discs sealing said passages and a quantity of oil filling the turbine cavity and extending to said burst discs.

7. A hydraulic power supply as defined in claim 6 wherein the improvement further comprises means for compensating for thermal expansion and contraction of the oil sealed by the burst discs.

8. A hydraulic power supply which may be stored prior to use and having a sealed reservoir filled with oil and means for pumping oil from the reservoir comprising a pump within the reservoir and a gas turbine outside the reservoir and drivingly connected to the pump, the gas turbine having a turbine cavity and gas inlet and exhaust passages communicating with the turbine cavity, the improvement comprising a means sealing said passages and a quantity of oil filling the turbine cavity and extending to said sealing means, and a bellows positioned to compensate for thermal expansion and contraction of the oil sealed by said sealing means.

9. A hydraulic power supply having an oil reservoir and means for pumping oil from the reservoir comprising a pump within the reservoir and a gas turbine drivingly connected to the pump and having a turbine cavity, the improvement comprising a pair of burst discs sealing said turbine cavity and a quantity of oil filling the turbine cavity during storage and before operation of the turbine.

10. The method of preventing entry of air from a gas turbine to an oil reservoir in a hydraulic power supply during storage thereof and having a pump for pumping oil from the reservoir, a gas turbine for driving the pump and having a casing with a turbine cavity and gas inlet and exhaust passages communicating with the turbine, and sealing means positioned one in each of said gas inlet and exhaust passages including at least one burst disc, comprising filling the turbine cavity with oil to preclude leakage of oil from the reservoir thereto and the existence of any significant volume of air that might otherwise migrate to the reservoir if oil could leak from the reservoir to the turbine cavity, and positioning a bellows to compensate for thermal expansion and contraction of the oil sealed by said sealing means.

* * * * *